United States Patent
Dede et al.

(10) Patent No.: US 10,965,172 B2
(45) Date of Patent: Mar. 30, 2021

(54) SHAPE ADAPTIVE WIRELESS CHARGING COIL FOR VEHICLE INTERIOR

(71) Applicant: Toyota Motor Engineering & Manufacturing North America, Inc., Plano, TX (US)

(72) Inventors: Ercan M. Dede, Ann Arbor, MI (US); Chungchih Chu, Ann Arbor, MI (US); Paul Schmalenberg, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 366 days.

(21) Appl. No.: 16/103,605

(22) Filed: Aug. 14, 2018

(65) Prior Publication Data
US 2020/0059120 A1    Feb. 20, 2020

(51) Int. Cl.
| | |
|---|---|
| H01M 10/46 | (2006.01) |
| H02J 50/90 | (2016.01) |
| H02J 7/02 | (2016.01) |
| H02J 50/12 | (2016.01) |
| H02J 50/80 | (2016.01) |
| H01F 38/14 | (2006.01) |

(52) U.S. Cl.
CPC .............. *H02J 50/90* (2016.02); *H01F 38/14* (2013.01); *H02J 7/025* (2013.01); *H02J 50/12* (2016.02); *H02J 50/80* (2016.02)

(58) Field of Classification Search
CPC .. H02J 7/025; H02J 50/90; H02J 50/80; H02J 7/0042; H02J 50/10; H02J 50/005; H01F 38/14

USPC ......... 320/108, 114, 115; 307/104; 336/137, 336/208
See application file for complete search history.

(56) References Cited

U.S. PATENT DOCUMENTS

| | | |
|---|---|---|
| 7,728,551 B2 | 6/2010 | Reed et al. |
| 8,791,600 B2 | 7/2014 | Soar |

(Continued)

FOREIGN PATENT DOCUMENTS

CN    106560904 A    4/2017

OTHER PUBLICATIONS

Carta et al.; "Design and Implementation of Advanced Systems in a Flexible-Stretchable Technology for Biomedical Applications"; Sens. Actuators A: Phys. (2009), Oct. 2016; 9 pages.

(Continued)

*Primary Examiner* — Edward Tso
(74) *Attorney, Agent, or Firm* — Snell & Wilmer LLP

(57) ABSTRACT

Methods, systems, and apparatus for a wireless charging apparatus. The wireless charging apparatus includes a layer or sheet of polymeric or similarly compliant material. The wireless charging apparatus includes an inductive loop embedded within the layer or sheet of polymeric material. The inductive loop has a first shape and a first size. The wireless charging apparatus includes one or more actuators. The one or more actuators are configured to move or shape the layer or sheet of polymeric material and the inductive loop. The wireless charging apparatus includes a controller. The controller is configured to determine a second shape or a second size for the inductive loop. The controller is configured to move or adjust the one or more actuators to form the inductive loop into a second shape or a second size.

20 Claims, 6 Drawing Sheets

(56) References Cited

U.S. PATENT DOCUMENTS

| | | | |
|---|---|---|---|
| 8,915,904 B2 | 12/2014 | Brennan et al. | |
| 9,327,608 B2 | 5/2016 | Gibbons, Jr. | |
| 9,356,473 B2 | 5/2016 | Ghovanloo | |
| 9,780,573 B2 * | 10/2017 | McCauley | H02J 50/70 |
| 9,812,246 B1 | 11/2017 | Nunez et al. | |
| 9,862,277 B2 * | 1/2018 | Dames | H02J 50/40 |
| 2010/0144143 A1 * | 6/2010 | Okamura | H01L 21/76897 |
| | | | 438/675 |
| 2012/0212178 A1 | 8/2012 | Kim | |
| 2013/0119926 A1 | 5/2013 | Lin | |
| 2014/0220422 A1 | 8/2014 | Rogers et al. | |
| 2017/0302097 A1 | 10/2017 | Kim et al. | |
| 2017/0353046 A1 | 12/2017 | Chen et al. | |

OTHER PUBLICATIONS

Nordmeyer-Massner; "Stretchable Coil Arrays: Application to Knee Imaging Under Varying Flexion Angles"; Magnetic Resonance in Medicine 67:872-879; 2012.

Yue; "A Flexible Integrated System Containing a Microsuper capacitor, a Photodetector, and a Wireless Charging-Coil"; ACS Nano; pp. 11249-11257; Nov. 2016.

Makarov et al.; "Shapeable Magnetoelectronics"; Applied Physics Reviews 3, 011101 (2016); DOI 10.1063/1.4938497.

Kim et al.; "Epidermal Electronics" Science; Aug. 12, 2011;333(6044):838-43: 10.1126/science.1206157. Abstract only.

* cited by examiner

SHAPE ADAPTIVE WIRELESS CHARGING COIL FOR VEHICLE INTERIOR

BACKGROUND

Field

This specification relates to improving the efficiency of the wireless or inductive charging of a personal device within a vehicle interior.

Description of the Related Art

Personal devices, such as smartphones, wearable technology, tablets or other personal devices, may charge their batteries via inductive charging. Inductive charging, also known as wireless charging, uses an electromagnetic field to transfer electrical energy between a source, such as a charging pad, and a device, such as a personal device, which stores and/or uses the electrical charge. A wireless charging transmitter has an inductive coil (or "inductive loop") and a power electronics circuit to create a high frequency alternating electromagnetic field. The wireless charging transmitter transmits the high frequency alternating electromagnetic field via the inductive loop. Another power electronics circuit converts the power from the electromagnetic field into direct current (DC) to charge a battery and/or run the personal device.

Typically, the inductive loop of the wireless charging transmitter has a fixed configuration, i.e., a fixed position and shape. Thus, when a personal device is placed in proximity to the wireless charging transmitter, the corresponding inductive coil of the wireless charging receiver may be mis-aligned or improperly sized with the inductive loop of the wireless charging transmitter. This misalignment or size mismatch results in a decrease in efficiency of the transfer of the electrical energy. That is, when the corresponding coil is mis-aligned, electrical energy is lost during the transfer of the electrical energy to the corresponding inductive coil.

Accordingly, there is a need for a system, apparatus and/or a method to improve the efficiency of wirelessly charging a personal device.

SUMMARY

In general, one aspect of the subject matter described in this specification may be embodied in a wireless or inductive charging apparatus ("wireless charging apparatus"). The wireless charging apparatus includes a layer or sheet of polymeric or similarly flexible material. The wireless charging apparatus includes an inductive loop embedded within the layer or sheet of polymeric material. The inductive loop has a first shape and a first size. The inductive loop is configured to wirelessly or inductively provide an electrical charge to a corresponding receiving inductive coil. The wireless charging apparatus includes one or more actuators. The one or more actuators are connected to the layer or sheet of polymeric or similarly flexible material. The one or more actuators are configured to move or shape the layer or sheet of polymeric material and the inductive loop. The wireless charging apparatus includes a controller. The controller is configured to determine a second shape or a second size for the inductive loop. The controller is configured to move or adjust the one or more actuators to form the inductive loop into the second shape or the second size.

These and other embodiments may optionally include one or more of the following features. The wireless charging apparatus may include a power source. The power source may provide the electrical charge through the inductive loop. The controller may be configured to determine that the inductive loop has been moved or adjusted into the second shape or the second size, and in response, the controller may activate the power source to provide the electrical charge through the inductive loop.

The wireless charging apparatus may have a support surface. The support surface supports the layer or sheet of polymeric material. The wireless charging apparatus may have a layer of a low friction gel, grease, or fluid. The layer of the low friction gel, grease, or fluid may be positioned between the support surface and the layer or sheet of polymeric material. The layer of the low friction gel, grease, or fluid may be a dielectric. The layer of the low friction gel, grease, or fluid may be configured to provide a low or reduced friction area for the layer or sheet of polymeric material to expand, contract or be reshaped. The support surface may be made from a semi-flexible material that conforms to a surface that the wireless charging apparatus is placed on. The layer or the sheet of the polymeric material may be a silicone or similarly flexible or compliant sheet and the support surface may be a semi-rigid support surface.

The wireless charging apparatus may include at least one of a sensor or a communication device that receives power data that indicates an amount of power received by the corresponding receiving inductive coil. The controller may be configured to determine the amount of electrical energy that is wirelessly or inductively transferred based on the power data. The controller may be configured to determine the second shape or the second size based on an amount of the electrical energy that is wirelessly or inductively transferred to the corresponding receiving inductive coil. The controller may be configured to move or adjust the one or more actuators to form the inductive loop into the second shape or the second size that maximizes the amount of electrical energy that is wirelessly or inductively transferred.

The wireless charging apparatus may include a wireless charging transmitter. The wireless charging transmitter may include the inductive loop and may be configured to provide a wireless charging signal through the inductive loop to the corresponding receiving inductive coil. The controller may be configured to determine a resonant frequency of a receiver of a receiving device. The controller may be configured to tune or adjust a resonant frequency of the wireless charging transmitter based on the resonant frequency of the receiver. The controller may be configured to determine the second shape or the second size for the inductive loop based on the resonant frequency of the wireless charging transmitter.

In another aspect, the subject matter may be embodied in a method for transmitting a wireless charge to a personal device. The method includes detecting or determining at least one of a receiving inductive coil shape or size or an amount of the wireless charge received by the receiving inductive coil. The method includes determining a transmitting inductive coil shape or size based on the at least one of the receiving inductive coil shape or size or the amount of the wireless charge received. The method includes shaping, using one or more actuators, a shape or a size of a polymeric sheet with an inductive coil embedded within based on the transmitting inductive coil shape or size. The method includes transmitting, using a power source, the wireless charge through a transmitting inductive coil to a corresponding receiving inductive coil of the personal device.

In another aspect, the subject matter may be embodied in a wireless charging apparatus. The wireless charging apparatus includes a polymeric sheet and a wireless charging transmitter. The wireless charging transmitter is configured to provide a wireless charge set at a resonant frequency. The wireless charging transmitter has an inductive loop that is embedded within the polymeric sheet. The inductive loop has a first shape and a first size. The wireless charging apparatus includes one or more actuators connected to the polymeric sheet and is configured to move or shape the polymeric sheet and the inductive loop. The wireless charging apparatus includes a controller connected to the one or more actuators. The controller is configured to adjust the resonant frequency of the wireless transmitter. The controller is configured determine a second shape or a second size for the inductive loop based on the resonant frequency. The controller is configured to move or adjust the one or more actuators to form the inductive loop into the second shape or the second size.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
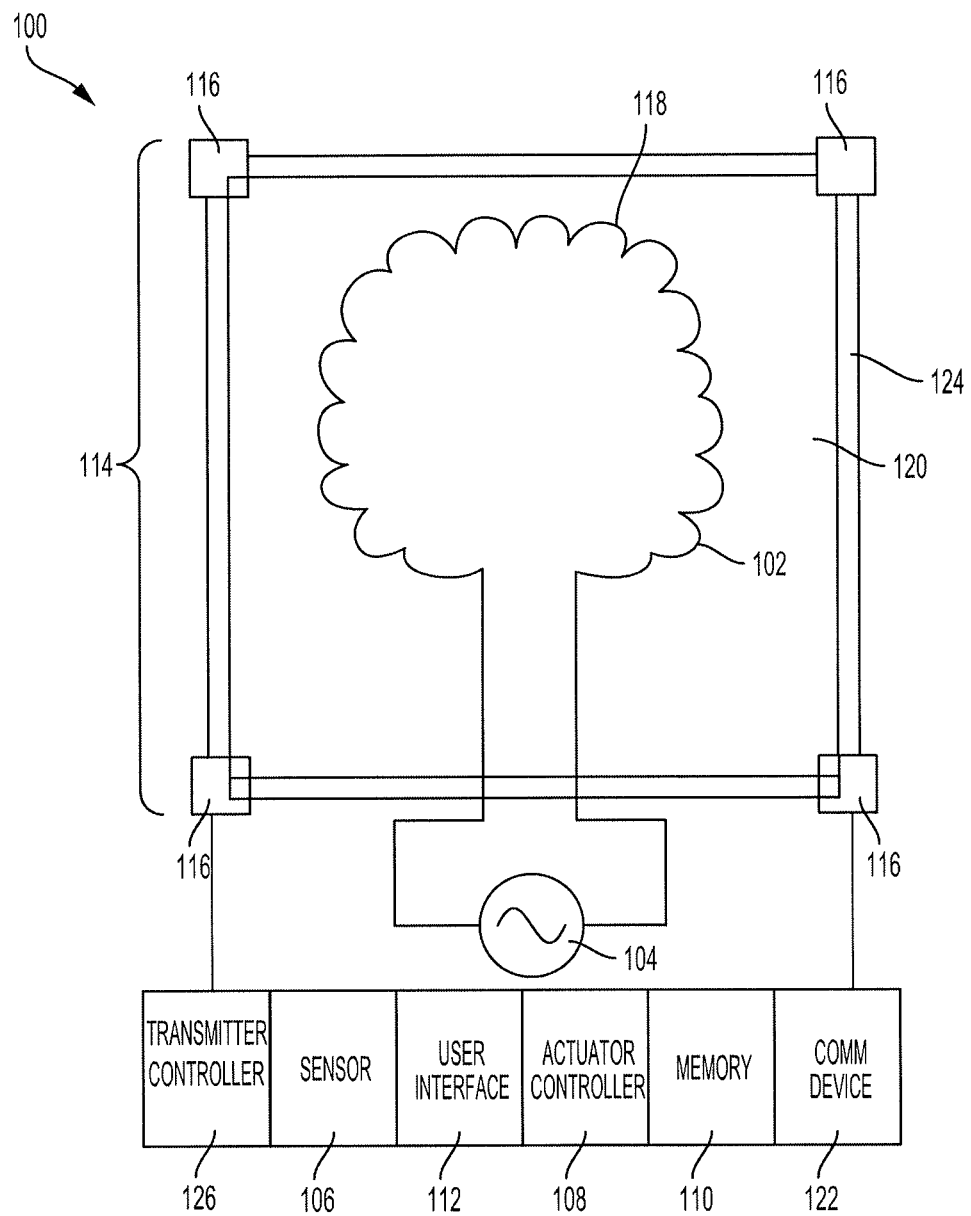
FIG. 1 is a block diagram of an example wireless charging apparatus according to an aspect of the invention.

Disclosed herein are systems, devices, apparatuses and methods for wirelessly or inductively charging a personal device, such as a tablet, a smartphone, a laptop, a wearable technology, or other personal electronic device. Particular embodiments of the subject matter described in this specification may be implemented to realize one or more of the following advantages. The wireless charging apparatus wirelessly or inductively transmits an electrical charge (or "wireless charge") that wirelessly charges a device. The wireless charging apparatus includes a single inductive loop. The wireless charging apparatus may adjust or alter the shape or the size of a polymeric or similarly flexible or compliant material that has the single inductive loop embedded within to maximize the amount of electrical energy transmitted or provided to a corresponding inductive coil of a receiving device. By adjusting the shape or the size of the polymeric material, the wireless charging apparatus adjusts the size and/or the shape of the single inductive loop, which allows the wireless charging apparatus to transfer electrical energy more efficiently to the corresponding inductive coil. This minimizes the amount of electrical energy that is lost due to mis-alignment of the inductive loop and the inductive coil, for example. When the shape or the size of the polymeric material is adjusted and after the wireless charging apparatus completes charging, the polymeric material and/or the single inductive loop may return to an undeformed size and/or shape.

For example, an inductive coil of a device, such as a phone, may be circular with a diameter of 2 inches, while the inductive loop of the wireless charging apparatus may initially be generally circular with a diameter of 1 inch, and thus, portions of the inductive coil may not receive the wireless charging signal. The wireless charging apparatus may expand the size of the circular shape of the inductive loop to have a diameter of 2 inches, and thus, more efficiently provide or transmit the wireless charging signal.

Other benefits and advantages include embedding the inductive loop within a polymeric membrane, layer or sheet. The wireless charging apparatus may have a layer of gel, liquid or other frictionless or reduced friction membrane ("low friction membrane"). The low friction membrane allows the wireless charging apparatus to manipulate, change or otherwise adjust the shape or the size of the polymeric/compliant material that the inductive loop is embedded within. Moreover, the low friction membrane may be made from a dielectric material that prevents unintended electrical contact to the charging coil. Moreover, the wireless charging apparatus may have a support surface. The support surface may be a rigid, a semi-rigid or a flexible support that is a base to the wireless charging apparatus. The support surface allows the wireless charging apparatus to rest in various positions within a vehicle, for example. If made from flexible material, the support surface may conform to various platforms within an interior of a vehicle, such as an armrest.

Additionally, the wireless charging apparatus may adjust or tune the resonant frequency of the wireless transmitter, and thus, the wireless charging apparatus may be configured to wireless charge various different personal devices.

Figure 2:
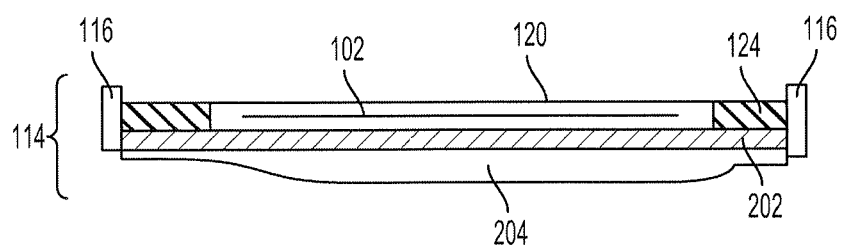
FIG. 2 shows a cross-sectional view of the different layers of the support device of the wireless charging apparatus of FIG. 1 according to an aspect of the invention.

FIG. 1 is a block diagram of a wireless charging apparatus 100. The wireless charging apparatus has a shaping support device ("support device") 114. The support device 114 may have a support member, mechanism, or frame 124 and one or more layers, mechanism linkages, and/or components. The one or more layers may include a polymeric or similarly flexible or compliant layer or sheet ("polymeric sheet") 120, a layer of gel, grease, liquid or other reduced friction or frictionless material or membrane ("low friction membrane") 202 and/or a support surface 204, as shown in FIG. 2, for example. The one or more components include one or more actuators 116.

The wireless charging apparatus has a shape adaptive inductive coil (or "inductive loop") 102 and a processor. An inductive loop 102 that is shape adaptive has the ability to change into different shapes and/or sizes when moved, stretched or otherwise adjusted. The wireless charging apparatus 100 may have a power source 104, a sensor 106, one or more processors, such as an actuator controller 108 or a transmitter controller 126, a memory 110, a user interface 112 and/or a communication ("comm") device 122. The actuator controller 108, appropriately programmed, may form, shape, configure or otherwise control the one or more actuators 116 to shape or form the inductive loop 102 within the polymeric sheet 120 and control the electrical charge provided to the inductive loop 102.

The wireless charging apparatus 100 includes an inductive loop 102. The wireless charging apparatus 100 may have a single inductive loop 102 or multiple inductive loops. The multiple inductive loops may be arranged in multiple layers and/or arranged in a single layer. The inductive loop 102 may be made from a flexible electrically conductive wire. The electrically conductive wire may be made from any electrically conductive material, such as copper, aluminum or aluminum, including any shape memory alloy, such as nickel-titanium (nitinol) or copper-aluminum-nickel. A shape memory alloy is an alloy that when deformed returns to a pre-deformed or original shape and/or size when heated. The inductive loop 102 may be embedded within a polymeric sheet 120 so that when the wireless charging apparatus 100 adjusts or modifies the shape and/or the size of the polymeric sheet 120, the shape and/or the size of the inductive loop 102 also changes. The original shape and/or the size of the inductive loop 102 embedded within the polymeric sheet 120 may include some slack 118 within the shape and/or the size so that the wireless charging apparatus 100 may increase the size and/or adjust the shape of the inductive loop 102. The slack 118 allows the flexible inductive loop 102 to be shaped using the one or more actuators 116.

The wireless charging apparatus 100 includes a support device 114, as shown in FIG. 2, for example. FIG. 2 shows a cross-sectional view of the different layers of the support device 114. The support device 114 includes the polymeric sheet 120 or similarly compliant material. The polymeric sheet 120 encloses, surrounds, embeds and/or otherwise encapsulates the inductive loop 102. The polymeric sheet 120 may have an initial shape and/or size and may be formed from silicone or other material that may be adjusted, shaped, deformed, stretched or otherwise formed into another shape and/or size.

The polymeric sheet 120 may have multiple layers that are each independently or semi-independently configurable to change shape and/or size. The inductive loop 102 may be positioned within or embedded within the polymeric sheet 120 of the support device 114. When the wireless charging apparatus 100 has multiple inductive loops 102, each inductive loop may be in a separate layer of a polymeric sheet 120 that has multiple layers. Thus, each layer may contain a separate inductive loop 102, and the wireless charging apparatus 100 may shape and/or size each layer of the polymeric sheet 120 independently and/or use each inductive loop 102 to perform a different function.

Figure 7:
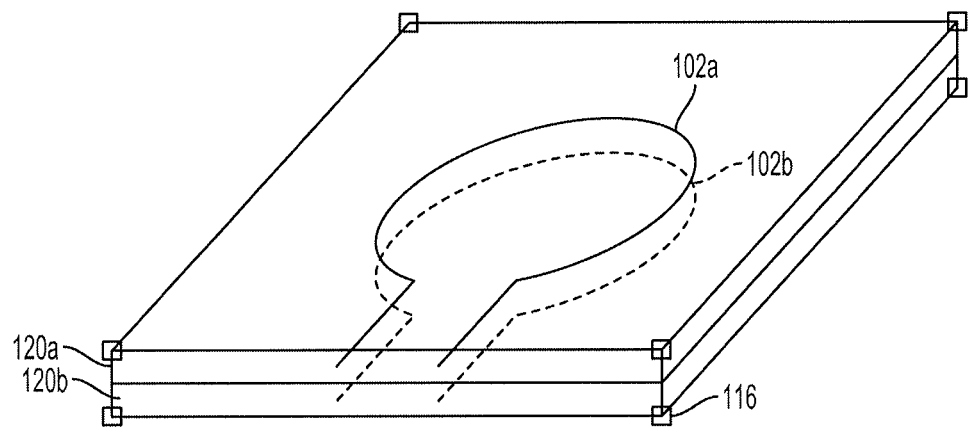
FIG. 7 shows an example of multiple inductive loops embedded within multiple layers of the polymeric sheet of the wireless charging apparatus of FIG. 1 according to an aspect of the invention.

FIG. 7 shows the wireless charging apparatus 100 having multiple layers of the polymeric sheet 120 with each layer having an independent inductive loop 102*a-b*. For example, the wireless charging apparatus 100 may use a first inductive loop 102*a* to transmit power and a second inductive loop 102*b* as a sensing coil to assist in optimizing the shape and/or the size of the first inductive loop 102*a* before charging the receiving device. The first inductive loop 102 may be embedded within a first layer of the polymeric sheet 120*a* and the second inductive loop 102*b* may be embedded within a second layer of the polymeric sheet 102*b*. In another example, the wireless charging apparatus 100 uses the second inductive loop 102*b* to transmit the power and uses the first inductive loop 102*a* to assist in optimizing the shape and/or the size of the second inductive loop 102*b*. In some implementations, each layer may contain a continuation of the same inductive loop, e.g., a single inductive loop 102 may be within both the first layer and the second layer of the polymeric sheet 102*a-b*, with built in slack to compensate for the independent layer movement. Each layer of the polymeric sheet 120 with the embedded inductive loop 102 may still contain multiple loops or turns within the layer of the polymeric sheet 120.

The support device 114 may have a frame 124 that is in contact with and surrounds, encases or encloses the polymeric sheet 120. The support device 114 includes one or more actuators 116. The one or more actuators 116 may include any number of actuators. As the number of actuators connected to the polymeric sheet 120 increases, the fidelity of the shaping and/or the sizing of the polymeric sheet 120 and the fidelity of the shaping and/or the sizing of the formed inductive loop 102 increases. The shape and/or the size of the polymeric sheet 120, and consequently, the shape and/or the size of the inductive loop 102 is based on the position or the location of each of the one or more actuators 116 relative to the other actuators of the one or more actuators 116.

The one or more actuators 116 move, stretch, size, resize or otherwise adjust the shape and/or the size of the polymeric sheet 120. The one or more actuators 116 may be in contact with and/or connected to the polymeric sheet 120. The one or more actuators 116 may pull or push a portion of the polymeric sheet 120 in one or more directions to resize, reshape and/or otherwise deform a portion of the polymeric sheet 120 and/or a portion of the inductive loop 102. When the polymeric sheet 120 has multiple layers, the one or more actuators 116 may be connected to each layer and independently shape, size and/or position the layer of the polymeric sheet 120 from a different layer of the polymeric sheet 120.

The support device 114 may have a layer of gel, grease, liquid or other reduced friction or frictionless material or membrane ("low friction membrane") 202. The low friction membrane 202 has a reduced or low friction coefficient, and as such, the low friction membrane 202 is a frictionless or a reduced friction area. The low friction membrane 202 may be positioned in between the polymeric sheet 120 and the support surface 204. The low friction membrane 202 may be formed on top of the support surface 204 and be positioned below the polymeric sheet 120 to allow the polymeric sheet 120 to be resized and/or reshaped more easily. The polymeric sheet 120 floats on top of the low friction membrane 202 so that one or more actuators 116 may stretch, move, pull or otherwise actuate the polymeric sheet 120 on top of the low friction membrane 202. In some implementations, the low friction membrane 202 may be a dielectric or other insulator, which prevents electrical contact to the support surface 204.

The support device 114 may have a support surface 204. The support surface 204 may be a rigid, semi-rigid and/or a flexible material. The support surface 204 may be stiffer than the low friction membrane 202. When the support surface 204 is made from the semi-rigid or flexible material, the support surface 204 may conform to a surface where the wireless charging apparatus 100 rests, such as an armrest, a dashboard, a table, a device holder or other surface. The support surface 204 provides for a base for the polymeric sheet 120 and the low friction membrane 202 to rest.

The wireless charging apparatus 100 may include a memory 110. The memory 110 may be coupled to the one or more processors, and may be one or more of a random access memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be stored and executed by the one or more processors. The memory 110 may store an initial shape and/or a size of the inductive loop 102. The memory 110 may store other configurations of shapes and/or sizes of the inductive loop 102. When storing the configuration of shapes and/or sizes of the inductive loop 102, the memory 110 may store the relative position and/or location of the one or more actuators 116 to form the shape and/or size of the inductive loop 102. The memory 110 may store one or more associations between shapes and/or sizes for the inductive loop 102 and a type of receiver device.

The wireless charging apparatus 100 may include a user interface 112. The user interface 112 may be an input/output device, such as a touch-screen display, that may have user interface elements to receive user input. The user interface 112 may display power data, such as the amount of power transferred to the receiving device, or receive user input, such as commands to turn on or off the wireless charging apparatus 100. The user interface 112 may receive other user inputs including touch inputs, such as a selection of one or more actuators 116. For example, a user may select an icon that represents one of the one or more actuators 116 and move the selected icon of the actuator to manipulate the shape, position, and/or size of the polymeric sheet 120, which results in a change in the shape, position, and/or size of the inductive loop 102.

The wireless charging apparatus 100 includes a power source 104. The power source 104 may be a power supply and provide an alternating current (AC). The power supply may be a separate distinct power supply for the wireless charging apparatus 100 or the wireless charging apparatus 100 may connect to a power supply of a vehicle.

The wireless charging apparatus 100 may include one or more sensors 106. The one or more sensors 106 may be embedded within or around the polymeric sheet 120 and/or may be a physically separate device that is connected. The one or more sensors 106 may include a camera, such as an optical camera or infrared camera, that captures image data to be later processed to determine a shape, a location, a position, a size and/or an orientation of an inductive coil of a device that receives the wireless electrical charge. The one or more sensors 106 may include a power sensor that measures an amount of electrical energy that is drawn or received by the receiving device or measures an amount of electrical energy that is transferred to the receiving device. The one or more sensors 106 may include a Hall Effect sensor. The Hall Effect sensor may measure or detect a change in an electro-magnetic field between a wireless transmitter and a wireless receiver. The one or more sensors 106 may include non-camera-based optical sensors.

The wireless charging apparatus 100 includes a processor, such as the actuator controller 108 or the transmitter controller 126. The actuator controller 108 is programmed to move or control the one or more actuators 116 to set or change the shape, the position, and/or the size of the polymeric sheet 120 to form the inductive loop 102 into a different size, shape, and/or location. The transmitter controller 126 sets the resonant frequency of the wireless charging apparatus 100. The processor activates or deactivates the power source 104, obtains shape and/or size information from the memory 110 and/or performs other functions, such as determining the amount of power transferred and displaying or outputting information to the user via the user interface 112.

The wireless charging apparatus 100 may include a communication device 122. The communication device 122 may communicate with a receiving device to obtain power data including the amount of power that is drawn or transferred to the receiving device, the resonant frequency of the receiving device and/or inductive coil information including the size and/or shape of the inductive coil of the receiving device.

Figure 3A:
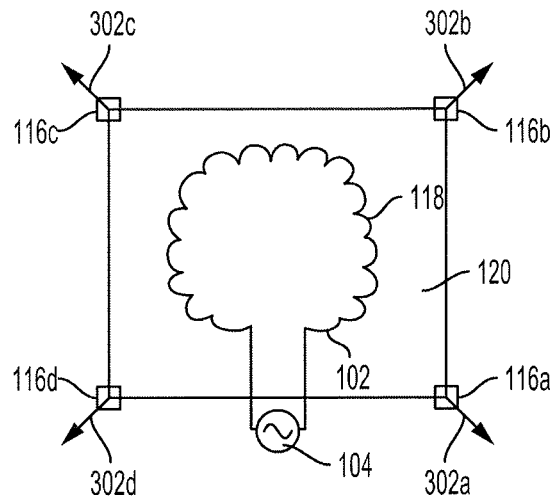
FIGS. 3A-3D show examples of the one or more actuators adjusting the shape and/or size of the polymeric sheet to change the shape and/or size of the inductive loop of the wireless charging apparatus of claim 1 according to an aspect of the invention.

FIGS. 3A-3D show the one or more actuators 116 moving in multiple directions to change, modify or adjust the shape and/or the size of the polymeric sheet 120 to change the shape and/or the size of the inductive loop 102. FIG. 3A shows the inductive loop 102 when the polymeric sheet 120 is not stretched and/or shaped. The inductive loop 102 has an original shape and/or size that may have some slack 118. The inductive loop 102 may be coiled in a circular shape with some slack 118, which may resemble a flower shape, as shown in FIG. 3A, for example. The wireless charging apparatus 100 may use the one or more actuators 116, such as the four actuators 116a-d in the corners, to stretch, pull or otherwise move the polymeric sheet in the directions 302a-d. When the wireless charging apparatus 100 moves the four actuators 116a-d in the directions 302a-d, the wireless charging apparatus 100 may increase or otherwise adjust the shape and/or the size of the polymeric sheet 120. The polymeric sheet 120 may glide, slide or otherwise move on top of the low friction membrane 202 when the one or more actuators 116a-d move in the one or more directions 302a-d.

Figure 3B:
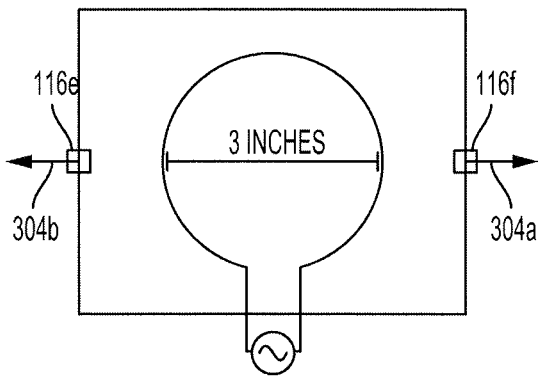

Once the one or more actuators 116a-d stretch, pull or otherwise move the polymeric sheet 120 in the one or more directions 302a-d, the motion of the one or more actuators 116a-d reduces or eliminates the slack 118 within the inductive loop 102 to form the inductive loop 102 into a circular shape, as shown in FIG. 3B, for example. FIG. 3B shows the circular-shaped inductive loop 102 with a diameter of 3 inches, for example.

Figure 3C:
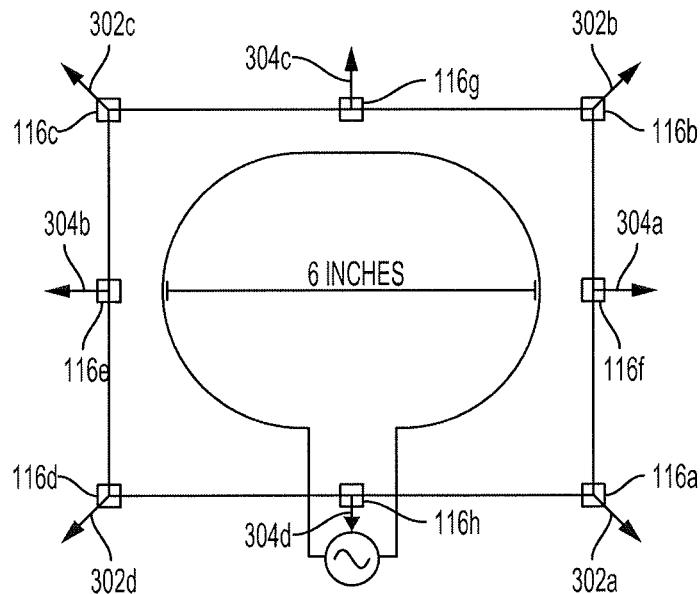
Figure 3D:
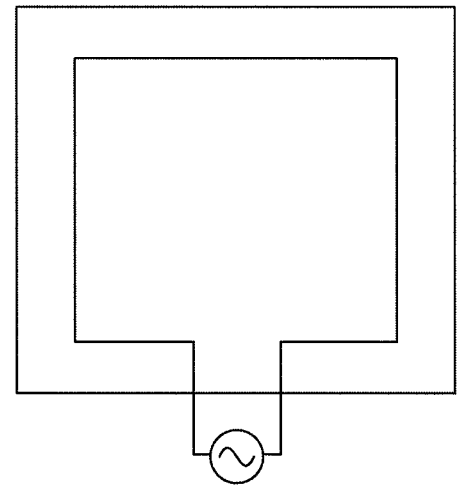
Figure 6A:
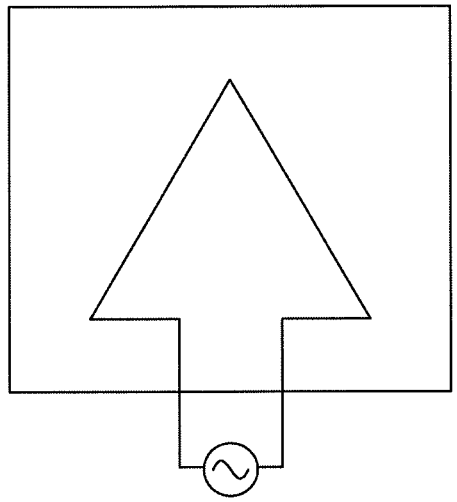
FIGS. 6A-6C show different initial and/or final shapes and/or size of the inductive loop of the wireless charging apparatus of FIG. 1 according to an aspect of the invention.
Figure 6B:
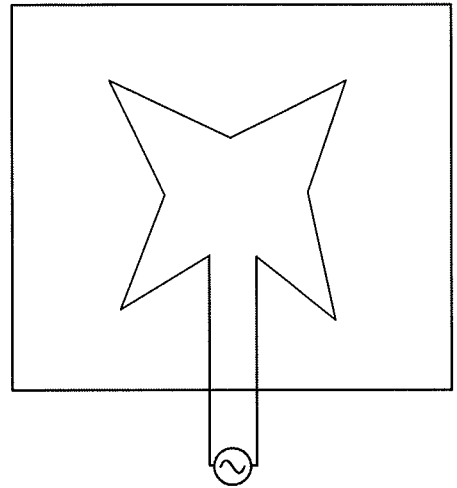
Figure 6C:
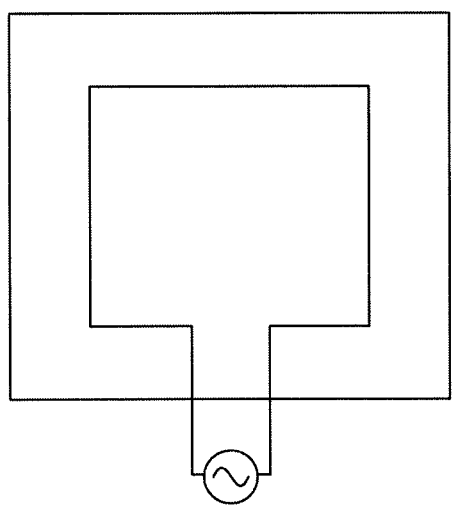

In some implementations, the wireless charging apparatus 100 may use the one or more actuators 116 to adjust a size of the polymeric sheet 120 to make the size of the inductive loop 102 larger or smaller. For example, the wireless charging apparatus 100 may use the one or more actuators 116e-f that are positioned on the edge of the polymeric sheet 120 to increase a diameter of the circular-shaped inductive loop 102. The wireless charging apparatus 100 may move the one or more actuators 116e-f in the directions 304a-b, respectively, to increase the diameter of the circular-shaped inductive loop 102 from 3 inches to 6 inches, as shown in FIG. 3C, for example. FIG. 3C shows the circular shaped inductive loop 102 with a larger diameter. In some implementations, the wireless charging apparatus 100 may use the one or more actuators, such as the one or more actuators 116a-d at the corners and the one or more actuators 116e-h at the edges, to move in various directions 302a-d and 304a-d, respectively, to reshape the inductive loop 102 into another shape, such as an approximate square or rectangle, as shown in FIG. 3D, for example. FIG. 3D shows a rectangular shaped inductive loop 102. The wireless charging apparatus 100 may shape the inductive loop 102 into various shapes including a square, a rectangle, a triangle, an ellipse, a parallelogram or other regular or re-entrant polygon to form a closed circuit, as shown in FIGS. 6A-6C, for example.

Figure 4A:
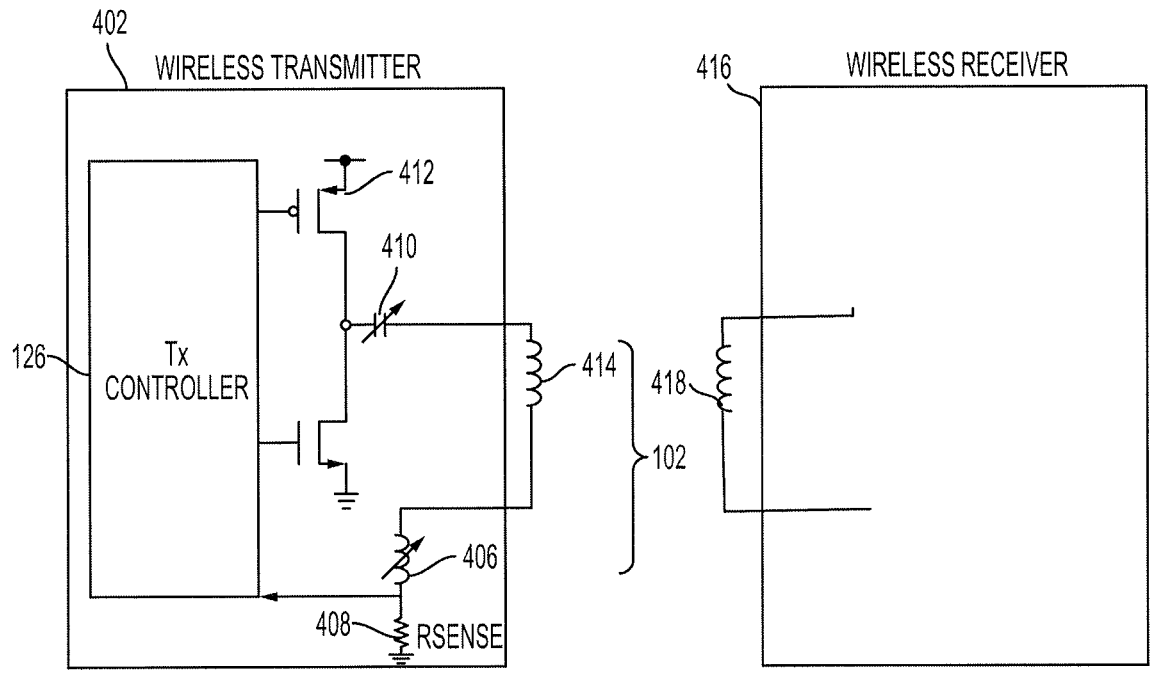
FIG. 4A shows an example circuit diagram of wireless transmitter of the wireless charging apparatus of FIG. 1 according to an aspect of the invention.
Figure 4B:
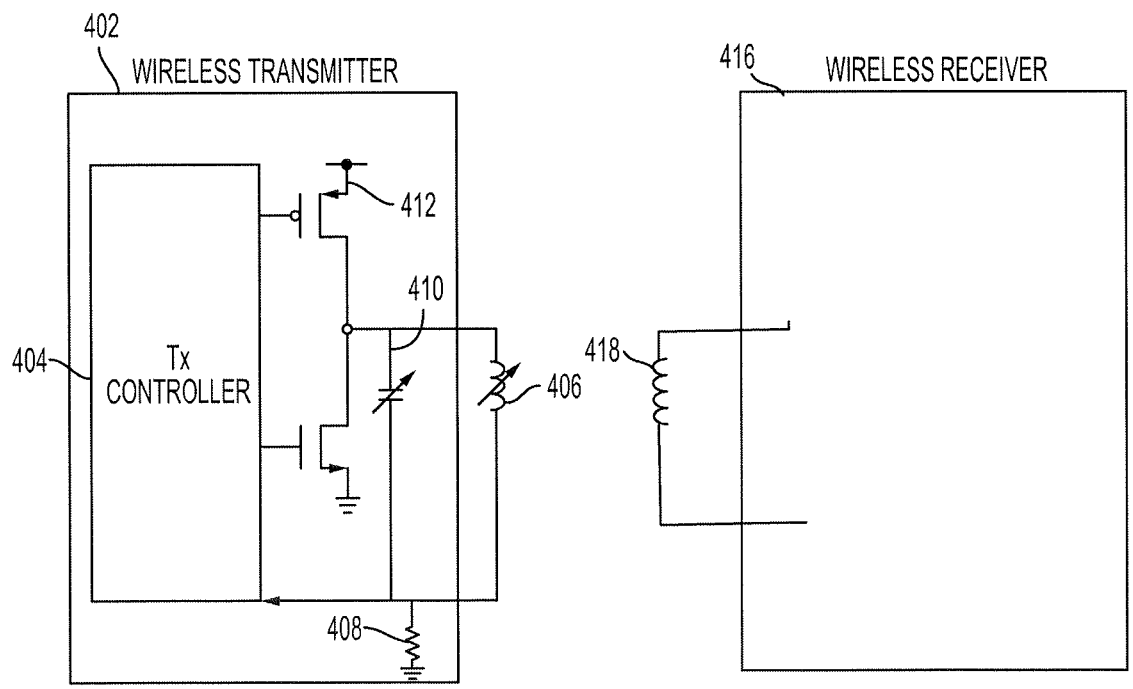
FIG. 4B shows another example circuit diagram of the wireless transmitter of the wireless charging apparatus of FIG. 1 according to an aspect of the invention.

FIGS. 4A-4B show circuit diagrams of the wireless charging transmitter 402 of the wireless charging apparatus 100. The wireless charging transmitter 402 includes the transmitter controller 126, one or more transistors 412, a variable capacitor 410, a variable inductor 406, a resistor 408 and the transmitting coil 414. The variable inductor 406 and the transmitting coil 414 may form the inductive loop 102.

The wireless charging transmitter 402 includes the transmitter controller 126 which may control and/or manage the power output emitted through the inductive loop 102 and may manage or control the capacitance of the variable capacitor 410 and/or the inductance of the variable inductor 406. The transmitter controller 126 may manage the inductance of the variable inductor 406 to set or tune the resonant frequency of the wireless transmitter to the resonant frequency of the receiving device. The transmitter controller 126 may manage or control the capacitance of the variable capacitor 410 to achieve the set resonant frequency regardless of the shape and/or the size of the inductive loop 102.

The transmitter controller 126 may be coupled or connected to the variable capacitor 410, the variable inductor 406 and the transmitting coil 414. FIG. 4A shows the components connected in series. That is, the one or more transistors 412 are connected in series with the variable capacitor 410, which is connected in series the variable inductor 406 and the transmitting coil 414, for example. In another example, FIG. 4B shows the one or more transistors 412, the variable capacitor 410 and the variable inductor 406 connected in parallel.

Figure 5:
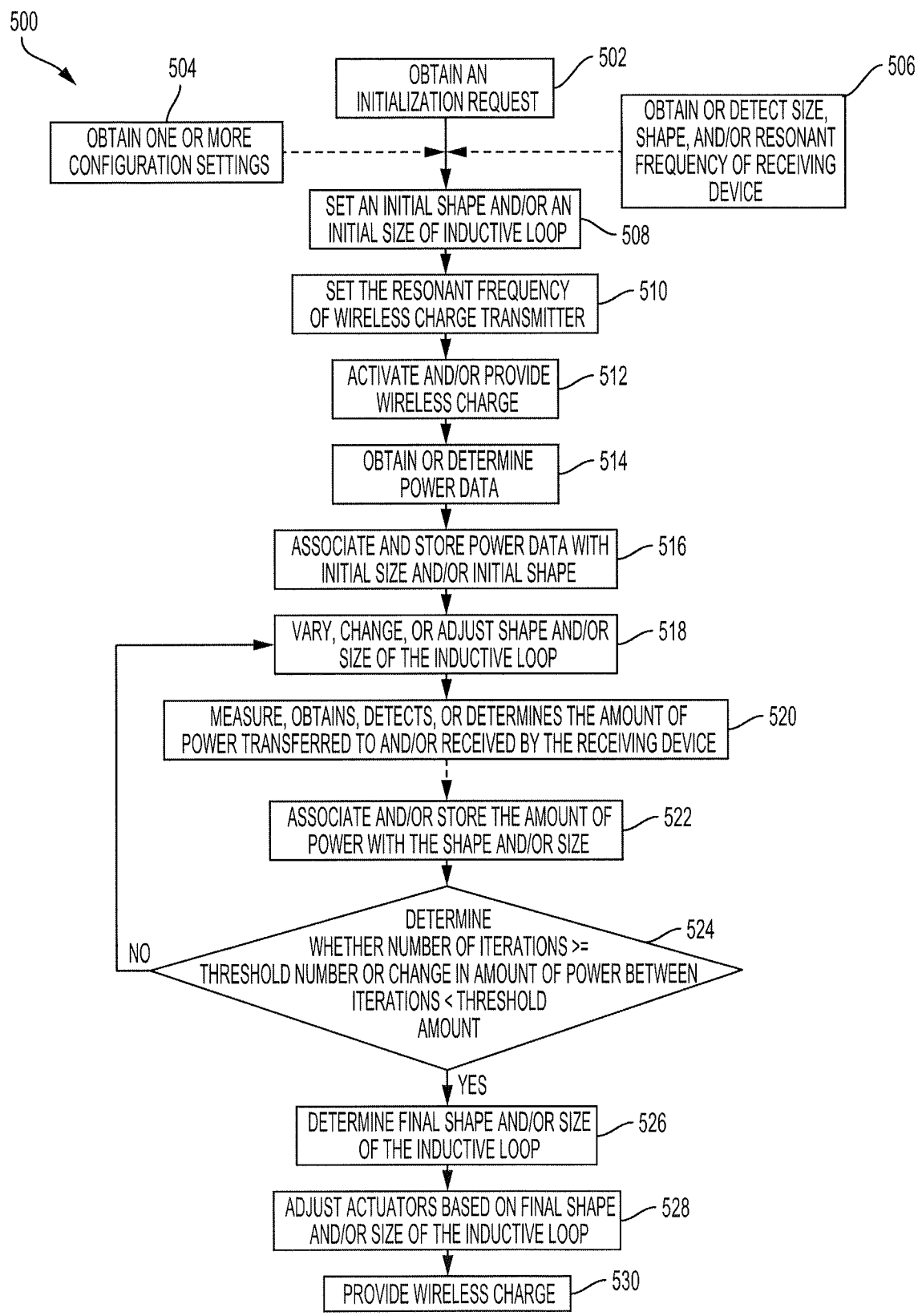
FIG. 5 is a flow diagram of an example process for controlling and/or adjusting the shape and/or size of the inductive loop of the wireless charging apparatus of FIG. 1 according to an aspect of the invention.

FIG. 5 is a flow diagram of a process 500 to more efficiently wirelessly charge a device. One or more computers or one or more data processing apparatuses, for example, the one or more processors, such as the actuator controller 108 or transmitter controller 126 of the wireless charging apparatus 100 of FIG. 1, appropriately programmed, may implement the process 500.

The wireless charging apparatus 100 may obtain an initialization request (502). The wireless charging apparatus 100 may receive the initialization request when a user activates the wireless charging apparatus 100, e.g., when the wireless charging apparatus 100 is turned on. The wireless charging apparatus 100 may receive the initialization request from one or more sensors 106, e.g., when a device that needs to be charged is within a threshold distance of the wireless charging apparatus 100. For example, when a smartphone, wearable technology or other device that has wireless charging capability is within a threshold distance of the wireless charging apparatus, a sensor 106 may detect the device and initialize the wireless charging apparatus 100.

The wireless charging apparatus 100 may obtain one or more configuration settings (504). The initialization request may include the one or more configuration settings. The one or more configuration settings may indicate the position of the one or more actuators 116 relative to each other, and consequently, the initial shape and/or size of the polymeric sheet 120 and inductive loop 102. Since the one or more actuators 116 are coupled or connected to the polymeric sheet 120 the position of the one or more actuators 116 affects the shape and/or the size of the polymeric sheet 120, which affects the shape, the position, and/or the size of the inductive loop 102.

The initial shape and/or the size of the inductive loop 102 may be a circular shape with some slack 118, as shown in FIG. 3A, for example. In another example, the inductive loop 102 may be a re-entrant star-shape, as shown in FIG. 6B, triangular, as shown in FIG. 6A, rectangular, as shown in FIG. 6C, elliptical, circular or other polygonal shape that is a closed-circuit, for example. The star-shaped inductive loop 102 may have one or more peaks and one or more valleys. The one or more valleys may be stretched or moved to form a rectangular shape, for example.

In some embodiments, the wireless charging apparatus 100 may have previously stored the one or more configuration settings in the memory 110. The wireless charging apparatus 100 may obtain the previously-stored one or more configuration settings and may move, adjust or otherwise control the one or more actuators 116 to stretch, size or shape the polymeric sheet 120 to set the initial size and/or shape of the inductive loop 102 and form a closed-circuit.

The wireless charging apparatus 100 may obtain or detect a size and/or a shape of an inductive coil of a receiving device and/or a resonant frequency of the receiving device (506). The receiving device receives the electrical charge to store or charge a battery of the receiving device. The wireless charging apparatus 100 may use one or more sensors 106 to obtain sensor data including the size and/or the shape of the inductive coil of the receiving device.

The one or more sensors 106 may be an optical camera/sensor or infrared camera/sensor. The sensor data may include image data of the inductive coil 418 of the receiving device 416. The optical sensor or the infrared sensor may capture an image of the inductive coil 418 of the receiving device 416, for example. In some implementations, the one or more sensors 106 may be a power sensor that measures an amount of electrical energy that is drawn or received by the receiving device 416 or measure an amount of electrical energy that is transferred to the receiving device 416.

In some implementations, the wireless charging apparatus 100 uses a Hall Effect sensor to determine the shape and/or the size of the inductive coil 418 of the receiving device 416. The hall effect sensor measure changes and/or responses within the electro-magnetic field between the inductive loop 102 of the wireless charging apparatus 100 and the inductive coil 418 of the receiving device 416 and uses the changes and/or responses to determine the shape and/or the size of the inductive coil 418 of the receiving device 416.

In some implementations, the wireless charging apparatus 100 uses a communication device 122 to communicate with the receiving device 416. The wireless charging apparatus 100 may receive information from the receiving device 416 that includes the shape and/or the size of the inductive coil 418 of the receiving device 416 and/or the resonant frequency of the receiving device 416.

The wireless charging apparatus 100 may cycle through various resonant frequencies to tune, change or otherwise adjust the resonant frequency of the wireless charging transmitter 402 of the wireless charging apparatus 100. The wireless charging apparatus 100 may adjust or tune an inductance of a variable inductor 406 and/or a capacitance of a variable capacitor 410 to adjust or tune the resonant frequency of the wireless charging transmitter 402.

The wireless charging apparatus 100 may use the one or more sensors 106 to determine whether the resonant frequency of the wireless charging apparatus 100 matches the resonant frequency of the receiving device. When the resonant frequencies match, the wireless charging apparatus 100 will have determined the resonant frequency of the receiving device 416. In some implementations, the wireless charging apparatus 100 uses the one or more sensors 106 to detect the resonant frequency of the receiving device 416.

The wireless charging apparatus 100 sets an initial shape and/or an initial size of the inductive loop 102 (508). The initial shape and/or the initial size of the inductive loop 102 may be based on the natural form of the undeformed polymeric sheet 120. When undeformed, the polymeric sheet 120 is not stretched and/or otherwise adjusted, and thus, does not deform the inductive loop 102 embedded within so that the inductive loop 102 may maintain some slack 118 within the inductive loop 102. When the one or more actuators 116 do not stretch, adjust, or otherwise move to change or alter the shape and/or the size of the polymeric sheet 120, the polymeric sheet 120 may return to the natural or undeformed form, which may cause the inductive loop 102 to return to the natural or undeformed form with the slack 118.

In some implementations, the wireless charging apparatus 100 may position the one or more actuators 116 to form the initial shape and/or the initial size of the inductive loop based on the one or more configuration settings. For example, a configuration setting may set the one or more actuators 116a-d to shape the inductive loop 102 into a coiled circular shape with slack 118 or a flower shape, as shown in FIG. 3A. In some implementations, the initial shape and/or the initial size is pre-configured.

The wireless charging apparatus 100 sets the resonant frequency of the wireless charging transmitter 402 based on the resonant frequency of the receiving device (510). The wireless charging apparatus 100 sets the resonant frequency of the wireless charging transmitter 402 to match the resonant frequency of the receiving device. This allows the wireless charging apparatus 100 to be compatible with different types of receiving devices. The wireless charging apparatus 100 maintains the specified resonant frequency (or "charging frequency") within a frequency band of approximately between 110 kHz and 205 kHz for the inductive loop 102 regardless of the shape and/or the size of the inductive loop 102.

In order to change the resonant frequency of the wireless charging transmitter 402 to the resonant frequency of the receiving device 416, the transmitter controller 126 changes, modifies or otherwise controls the capacitance through the variable capacitor 410 to assist in maximizing the amount of power transferred to and received by the receiving device 416. Once set, the resonant frequency may become fixed.

Once the initial shape and/or size of the inductive loop 102 is set and the resonant frequency of the wireless charging transmitter 402 is set, the wireless charging apparatus 100 may activate and provide an electrical charge (or "wireless charge") to the inductive loop 102 to emit an electric or wireless charge to the inductive coil 418 of the receiving device 416 (512). The wireless charging apparatus 100 may initially pulse the electric or wireless charge until the wireless charging apparatus 100 determines a final shape and/or a final size of the inductive loop 102.

The wireless charging apparatus 100 may obtain or determine power data including an amount of power that is transferred to and/or received by the inductive coil 418 of the receiving device 416 for the initial shape and/or the initial size of the inductive loop 102 (514). For example, the wireless charging apparatus 100 may use a power sensor to detect the amount of power that is transferred to the inductive coil of the receiving device 416. In another example, the wireless charging apparatus 100 may communicate with the receiving device 416 and receive, from the receiving device 416, the power data including the amount of power that was transferred to and received by the receiving device 416.

The wireless charging apparatus 100 may associate the obtained or determined power data including the amount of power with the initial shape and/or the initial size of the inductive loop 102 and store the association within the memory 110 (516). The wireless charging apparatus 100 may maintain a mapping or a table within the memory 110 that maps the amount of power transferred to and/or received by the receiving device 416 with the initial shape and/or the initial size of the inductive loop.

Once the amount of power is determined or obtained for the initial shape and/or the initial size of the inductive loop 102, the wireless charging apparatus 100 may vary the shape and/or the size of the inductive loop 102 to determine a final shape and/or a final size of the inductive loop 102 (518). Initially, the wireless charging apparatus 100 may set the size and/or the shape of the inductive loop 102 to correspond with the determined or obtained shape and/or size of the inductive coil 418 of the receiving device 416. The wireless charging apparatus may change the shape and/or the size of the polymeric sheet 120 to change the shape and/or the size of the inductive loop 102 using the one or more actuators 116. The one or more actuators 116 may move in one or more directions, as shown in FIGS. 3A-3D, for example, to shape the inductive loop 102 into one or more shapes and/or sizes including multiple shapes and/or sizes. The polymeric sheet 120 stretches, changes shapes or sizes, and/or otherwise adjusts when the one or more actuators 116 pull, push or otherwise move the polymeric sheet 120 on top of the low friction membrane 202. The polymeric sheet 120 glides, slides or otherwise moves on top of the low friction membrane 202, which reduces the amount friction or resistance while adjusting the shape and/or the size of the inductive loop 102.

The changes and/or modifications to the shape and/or the size of the polymeric sheet 120 may be incremental. The changes and/or modifications may correspond to changes and/or modifications to the initial shape and/or the initial size of the inductive loop 102. By starting with an initial shape and/or an initial size that closely corresponds with the shape and/or the size of the inductive coil 418 of the receiving device 416, this limits or reduces a number of iterations or configurations necessary to determine the shape and/or the size of the polymeric sheet 120, which results in a final shape and/or a final size of the inductive loop 102 that maximizes the amount of power transferred. In some implementations, the changes and/or modifications may be random, pre-determined, user configured via the user interface 112 or otherwise configured. For example, the user interface 112 may receive a selection of a user interface element that may be moved or dragged to move the actuator. The changes and/or modifications may be an incremental change or modification from the previous iteration or configuration.

For each of the one or more shapes and/or sizes, the wireless charging apparatus 100 may measure, obtain, detect and/or otherwise determine the amount of power transferred and/or received by the receiving device for the shape and/or the size of the inductive loop 102 (520). The wireless charging apparatus 100 associates and stores the amount of power that is transferred to and received by the receiving device with the shape and/or the size of the inductive loop 102, as described above (522). The wireless charging apparatus 100 may repeat the resizing and/or the reshaping of the inductive loop 102 for any number of iterations and/or configurations to determine a shape and/or a size of the inductive loop 102 that provides a maximum amount of power that is transferred to the receiving device 416.

The wireless charging apparatus 100 may determine whether the number of iterations and/or configurations of the shape and/or the size of the inductive loop 102 is greater than a threshold number of iterations and/or configurations or that the change in the amount of power transferred to and/or received by the receiving device 416 is less than a threshold amount (524). For example, the wireless charging apparatus 100 may count the number of iterations and/or configuration, and then, determine the final shape and/or the final size when the number iterations reaches or exceeds the threshold number. In another example, the wireless charging apparatus 100 may calculate a difference in the amount of power transferred to and/or received by the receiving device 416 among the different configurations, and then, determine the final shape and/or the final size when the difference is below the threshold amount.

The wireless charging apparatus 100 may determine the final shape and/or the final size of the inductive loop 102 (526). The wireless charging apparatus 100 may determine the final shape and/or the final size of the inductive loop 102 based on at least one of the obtained or determined shape of the inductive coil 418 of the receiving device 416, the size of the inductive coil 418 of the receiving device 416 and/or the amount of power transferred to or received by the receiving device 416. The shape and/or the size of the inductive loop 102 may directly correspond with and/or match the obtained or determined shape and/or size of the inductive coil 418, for example. The wireless charging apparatus 100 may use the power data to further adjust or make incremental changes and/or modifications to the shape and/or the size of the inductive loop 102 to maximize the amount of power transferred to and/or received by the receiving device. The maximum amount of power transferred to and/or received by the receiving device may have an efficiency of at least 80-90% of the amount of the wireless charge transmitted.

After the threshold number of iterations or configurations of shapes and/or sizes of the inductive loop 102, the wireless charging apparatus 100 may search and/or compare each association stored within the memory 110 to determine the association with the largest or greatest amount of power transferred to and/or received by the receiving device 416. The wireless charging apparatus 100 selects the shape and/or the size of the inductive loop 102 with the largest or greatest amount of power as the final shape and/or the final size of the inductive loop 102.

The wireless charging apparatus 100 sets, moves or otherwise adjusts the one or more actuators 116 based on the final shape and/or the final size of the inductive loop 102 that provides the maximum amount of power (528). The wireless charging apparatus 100 provides or continues to provide the wireless charge through the inductive loop 102 to the receiving device to power or charge the receiving device (530). The wireless charging apparatus 100 may no longer only pulse the wireless charge, but instead, may provide a constant or regular charge through the inductive loop 102 once the final shape and/or the final size of the inductive loop 102 is determined. The wireless charging apparatus 100 may use different inductive loops 102a-b in different layers of the polymeric sheet 120a-b to perform the transmission of the power or the sensing of the shape, the size, the location and/or the power of the receiving inductive coil of the receiving device. In some implementations, the wireless charging apparatus 100 may use a single inductive loop 102 that continues throughout multiple different layers of the polymeric sheet 120 and performs the transmitting and/or sensing in different portions of the single inductive loop 102 within the different layers of the polymeric sheet.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wireless charging apparatus, comprising:
   a layer or sheet of compliant material that is flexible;
   an inductive loop embedded within the layer or sheet of compliant material and having a first shape and a first size, the inductive loop being configured to wirelessly or inductively provide an electrical charge to a corresponding receiving inductive coil;
   one or more actuators connected to the layer or sheet of compliant material and configured to move or shape the layer or sheet of compliant material and the inductive loop; and
   a controller connected to the one or more actuators and configured to:
      determine a second shape or a second size for the inductive loop, and
      move or adjust the one or more actuators to form the inductive loop into the second shape or the second size.

2. The wireless charging apparatus of claim 1, further comprising:
   a power source for providing the electrical charge through the inductive loop;
   wherein the controller is configured to:
   determine that the inductive loop has been moved or adjusted into the second shape or the second size, and
   in response, activate the power source to provide the electrical charge through the inductive loop.

3. The wireless charging apparatus of claim 1, further comprising:
   a support surface that supports the layer or sheet of compliant material; and
   a layer of a low friction gel, grease, or fluid positioned between the support surface and the layer or sheet of compliant material, the layer of the low friction gel, grease or fluid being a dielectric and being configured to provide a low or reduced friction area for the layer or sheet of compliant material to expand, contract or be reshaped.

4. The wireless charging apparatus of claim 3, wherein the support surface is made from a semi-flexible material that conforms to a surface that the wireless charging apparatus is placed on.

5. The wireless charging apparatus of claim 1, wherein the layer or sheet of compliant material is a silicone sheet and the support surface is a semi-rigid support surface.

6. The wireless charging apparatus of claim 1, wherein the controller is configured to determine the second shape or the second size based on an amount of the electrical energy that is wirelessly or inductively transferred to the corresponding receiving inductive coil.

7. The wireless charging apparatus of claim 6, further comprising:
   at least one of a sensor or a communication device that receives power information that indicates an amount of the electrical charge received by the corresponding receiving inductive coil;
   wherein the controller is configured to:
   determine the amount of the electrical energy that is wirelessly or inductively transferred based on the power information.

8. The wireless charging apparatus of claim 7, wherein the controller is configured to move or adjust the one or more actuators to form the inductive loop into the second shape or the second size that maximizes the amount of the electrical energy that is wirelessly or inductively transferred.

9. The wireless charging apparatus of claim 1, wherein the one or more actuators include four actuators, each actuator of the four actuators positioned at an edge or corner of the layer or sheet of compliant material, wherein to move or adjust the one or more actuators to form the inductive loop into the second shape or the second size the controller is configured to move at least one of the four actuators to a different position relative to the other actuators.

10. The wireless charging apparatus of claim 1, further comprising:
a wireless charging transmitter that includes the inductive loop and is configured to provide the electrical charge through the inductive loop to the corresponding receiving inductive coil;
wherein the controller is configured to:
determine a resonant frequency of a receiver of a receiving device, and
tune or adjust a resonant frequency of the wireless charging transmitter based on the resonant frequency of the receiver.

11. The wireless charging apparatus of claim 10, wherein to determine the second shape or the second size for the inductive loop is further based on the resonant frequency of the wireless charging transmitter.

12. A method for transmitting a wireless charge to a personal device, comprising:
detecting or determining at least one of a receiving inductive coil shape or size or an amount of the wireless charge received by the receiving inductive coil;
determining a transmitting inductive coil shape or size based on the at least one of the receiving inductive coil shape or size or the amount of the wireless charge received;
shaping, using one or more actuators, a shape or a size of a polymeric sheet with an inductive coil embedded within based on the transmitting inductive coil shape or size; and
transmitting, using a power source, the wireless charge through a transmitting inductive coil to a corresponding receiving inductive coil of the personal device.

13. The method of claim 12, further comprising:
determining a resonant frequency of a receiver of the personal device; and
setting a resonant frequency of a wireless transmitter based on the resonant frequency of the receiver.

14. The method of claim 13, wherein determining the transmitting inductive coil shape or size is further based on the resonant frequency of the wireless transmitter.

15. The method of claim 12, wherein detecting or determining the at least one of the receiving inductive coil shape or size or the amount of the wireless charge received by the receiving inductive coil includes determining the amount of the wireless charge received by the receiving inductive coil, wherein determining the transmitting inductive coil shape or size is based on the amount of the wireless charge received.

16. The method of claim 15, wherein the transmitting inductive coil shape or size is shaped or size so that the amount of the wireless charge received is at least 80-90% of an amount of the wireless charge transmitted.

17. A wireless charging apparatus, comprising:
a first polymeric sheet;
a wireless transmitter configured to provide a wireless charge set at a resonant frequency and having a first inductive loop embedded within the first polymeric sheet, the first inductive loop having a first shape and a first size;
one or more actuators connected to the first polymeric sheet and configured to move or shape the first polymeric sheet and the first inductive loop; and
a controller connected to the one or more actuators and configured to:
adjust the resonant frequency of the wireless transmitter,
determine a second shape or a second size for the first inductive loop based on the resonant frequency, and
move or adjust the one or more actuators to form the first inductive loop into the second shape or the second size.

18. The wireless charging apparatus of claim 17, wherein the controller is configured to determine the second shape or the second size further based on an amount of power of the wireless charge that is wirelessly or inductively transferred to a corresponding receiving inductive coil.

19. The wireless charging apparatus of claim 18, wherein the controller is configured to determine the amount of power of the wireless charge that is wirelessly or inductively transferred to the corresponding receiving inductive coil.

20. The wireless charging apparatus of claim 17, further comprising: a second polymeric sheet, wherein the wireless transmitter has a second inductive loop, wherein the second inductive loop is embedded within the second polymeric sheet.

* * * * *